(12) United States Patent
Saeki

(10) Patent No.: US 12,362,599 B2
(45) Date of Patent: Jul. 15, 2025

(54) WIRELESS POWER TRANSMISSION SYSTEM AND POWER RECEIVER

(71) Applicant: Murata Manufacturing Co., Ltd., Kyoto-fu (JP)

(72) Inventor: Hiromasa Saeki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 43 days.

(21) Appl. No.: 18/528,334

(22) Filed: Dec. 4, 2023

(65) Prior Publication Data
US 2024/0106277 A1 Mar. 28, 2024

Related U.S. Application Data

(63) Continuation of application No. PCT/JP2022/027673, filed on Jul. 14, 2022.

(30) Foreign Application Priority Data

Jul. 19, 2021 (JP) .................................. 2021-118873

(51) Int. Cl.
H02J 50/12 (2016.01)
H02J 50/00 (2016.01)
H02J 50/40 (2016.01)

(52) U.S. Cl.
CPC ............ H02J 50/12 (2016.02); H02J 50/005 (2020.01); H02J 50/402 (2020.01)

(58) Field of Classification Search
CPC ........ H02J 50/12; H02J 50/005; H02J 50/402; H02J 50/23; H02J 50/27; H02J 50/70;
(Continued)

(56) References Cited

U.S. PATENT DOCUMENTS

| | | | | |
|---|---|---|---|---|
| 11,264,837 | B2 * | 3/2022 | Peralta | ...................... H04B 5/26 |
| 11,502,547 | B2 * | 11/2022 | Peralta | .................... H01Q 1/085 |
| 2024/0413665 | A1 * | 12/2024 | Saeki | ...................... H02J 50/12 |

FOREIGN PATENT DOCUMENTS

| | | | | |
|---|---|---|---|---|
| CA | 2717533 | A1 * | 4/2011 | ............. F41A 23/18 |
| CA | 2788091 | A1 * | 8/2011 | ............. H01F 27/36 |

(Continued)

OTHER PUBLICATIONS

International Search Report issued in PCT/JP2022/027673; mailed Sep. 20, 2022.

*Primary Examiner* — Jared Fureman
*Assistant Examiner* — Michael J Warmflash
(74) *Attorney, Agent, or Firm* — Studebaker Brackett PLLC

(57) ABSTRACT

A wireless power transmission system includes a structure surrounded as a whole by an electromagnetic wave-shielding member having an appropriate conductivity, at least one power transmission unit, and at least one power reception unit. A power reception unit includes a power receiver including a dielectric substrate, a rectifier circuit, and a power reception antenna. The power reception antenna includes power reception antenna lines in a same plane on the dielectric substrate. One ends of the power reception antenna lines are connected to the rectifier circuit, and other ends different from the one ends connected to the rectifier circuit are open ends. A planar shape of the dielectric substrate is a 2N-sided polygon with line symmetry (where N is an integer of two or more), and the power reception antenna lines are along N sides that are adjacent to and different from each other of the dielectric substrate.

18 Claims, 11 Drawing Sheets

(58) Field of Classification Search
CPC . H01F 38/14; H01Q 9/04; H01Q 9/30; H01Q 11/08
See application file for complete search history.

(56) References Cited

FOREIGN PATENT DOCUMENTS

| | | | |
|---|---|---|---|
| JP | 2005-303528 A | | 10/2005 |
| JP | 2020089209 A | * | 6/2020 |

* cited by examiner (SUPPLY OF POWER IN DIPOLE MODE IN OPEN SPACE)

(SUPPLY OF POWER IN MONOPOLE MODE IN OPEN SPACE)

(SUPPLY OF POWER IN DIPOLE MODE IN ENCLOSED SPACE)

(SUPPLY OF POWER IN MONOPOLE MODE IN ENCLOSED SPACE)

POWER RECEPTION ANTENNA DIRECTION

WIRELESS POWER TRANSMISSION SYSTEM AND POWER RECEIVER

CROSS-REFERENCE TO RELATED APPLICATIONS

This application claims benefit of priority to International Patent Application No. PCT/JP2022/027673, filed Jul. 14, 2022, and to Japanese Patent Application No. 2021-118873, filed Jul. 19, 2021, the entire contents of each are incorporated herein by reference.

BACKGROUND

Technical Field

The present disclosure relates to a wireless power transmission system. Specifically, the present disclosure relates to a wireless power transmission system using a power transmitter that transmits a high-frequency electromagnetic wave. The wireless power transmission system according to the present disclosure is directed toward a structure for increasing a degree of freedom in installation direction of a power receiver in supplying wireless power to a device or the like disposed in a space surrounded by walls, such as in a warehouse, factory, or vehicle, with high power transmission efficiency.

Background Art

In recent years, with an explosive increase in the number of IOT (Internet of Things) devices, challenges have arisen in a method of supplying power to these devices. Wiring connections to a huge number of devices are difficult. Furthermore, when a battery is used as a power supply, it takes a lot of work to replace an exhausted battery. To solve these issues, a technique is being expected in which power is transmitted wirelessly.

Japanese Unexamined Patent Application Publication No. 2020-89209 discloses a wireless power transmission system in which, assuming that a space surrounded by metal is regarded as a resonator, an electromagnetic wave is emitted from a power transmission unit at an inherent resonant frequency of the resonator, and power is transmitted to a power receiver within the resonator. Japanese Unexamined Patent Application Publication No. 2020-89209 discloses the power receiver with a structure in which a first power receiver and a second power receiver are disposed so as to face each other in parallel and are connected by a conductive post. It is believed that, even if the power transmission unit and a power reception unit are hardly visible due to this structure, power can be transmitted to the power reception unit with high efficiency.

SUMMARY

In a wireless power transmission system in which, assuming that a space surrounded by metal is regarded as a resonator, power is transmitted at an inherent resonant frequency of the resonator, in an existing method, there has not been revealed the design of an appropriate power transmission-reception antenna that enables a power receiver to have a high degree of freedom in installation.

As for the system disclosed in Japanese Unexamined Patent Application Publication No. 2020-89209, there is provided the structure of the power receiver in which the first power receiver and the second power receiver are disposed so as to face each other in parallel and are connected by the conductive post. Japanese Unexamined Patent Application Publication No. 2020-89209 does not describe any direction in which power can be received, no direction in which power can be received has thus been revealed, and a scheme to improve a direction in which power can be received has not been implemented. Furthermore, the first power receiver and the second power receiver are three-dimensionally disposed, and this structure is too thick to be installed in an IOT device.

Accordingly, the present disclosure provides a wireless power transmission system that has a high degree of freedom for the installation direction of a power receiver. Furthermore, the present disclosure aims to provide a power receiver that constitutes a power reception unit of the above-described wireless power transmission system.

A wireless power transmission system according to the present disclosure includes a structure surrounded as a whole by an electromagnetic wave-shielding member having an appropriate conductivity, at least one power transmission unit, and at least one power reception unit, and the wireless power transmission system uses a resonant mode in the structure. The power reception unit is constituted by a power receiver including a dielectric substrate, a rectifier circuit, and a power reception antenna. The power reception antenna includes a power reception antenna line disposed in a same plane on the dielectric substrate. One end of the power reception antenna line is connected to the rectifier circuit. Of the power reception antenna line, another end different from the one end connected to the rectifier circuit is an open end. A planar shape of the dielectric substrate is a 2N-sided polygon with line symmetry (where N is an integer of two or more), and the power reception antenna line is disposed along N sides that are adjacent to and different from each other of the dielectric substrate.

A power receiver according to the present disclosure constitutes, of a wireless power transmission system that includes a structure surrounded as a whole by an electromagnetic wave-shielding member having an appropriate conductivity, at least one power transmission unit, and at least one power reception unit and that uses a resonant mode in the structure, the power reception unit. The power receiver includes a dielectric substrate, a rectifier circuit, and a power reception antenna. The power reception antenna includes a power reception antenna line disposed in a same plane on the dielectric substrate. One end of the power reception antenna line is connected to the rectifier circuit. Of the power reception antenna line, another end different from the one end connected to the rectifier circuit is an open end. A planar shape of the dielectric substrate is a 2N-sided polygon with line symmetry (where N is an integer of two or more), and the power reception antenna line is disposed along N sides that are adjacent to and different from each other of the dielectric substrate.

The present disclosure can provide the wireless power transmission system that has a high degree of freedom for the installation direction of the power receiver. Furthermore, the present disclosure can provide the power receiver that constitutes the power reception unit of the above-described wireless power transmission system.

DETAILED DESCRIPTION

An embodiment of the present disclosure will be described below with reference to the drawings.

In the present description, terms (for example, "perpendicular", "parallel", "orthogonal" and others) representing a relationship between elements, and terms representing shapes of elements are not expressions referring to only their exact meanings, but expressions referring to a substantially equivalent range, for example, the inclusion of a difference of about a few percent.

Figure 1:
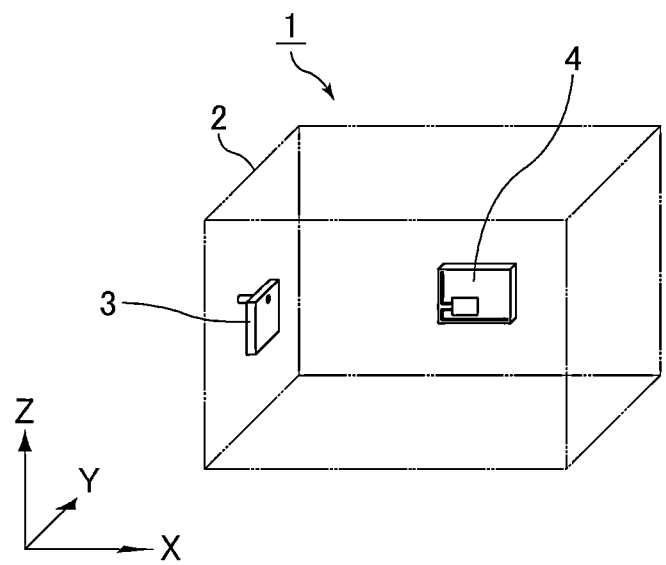
FIG. 1 is a configuration diagram illustrating an example of a wireless power transmission system according to the present disclosure.

FIG. 1 is a configuration diagram illustrating an example of a wireless power transmission system according to the present disclosure. In FIG. 1, assuming that a structure surrounded as a whole by an electromagnetic wave-shielding member 2 having an appropriate conductivity is regarded as a resonator, a wireless power transmission system 1 includes, in the structure, at least one power transmission unit 3, and at least one power reception unit 4. That is, the wireless power transmission system 1 refers to the whole of the structure that implements wireless power transmission. Note that the shape of the structure is not limited to a rectangular parallelepiped shape and may be, for example, a pentagonal prism shape that is pentagonal in a ZX plane, a quadrangular prism shape that is trapezoidal in the ZX plane, a semicircular cylinder shape that is semicircular in the ZX plane, or the like.

The wireless power transmission system 1 uses a resonant mode in the structure. The wireless power transmission system 1 has a space shielded by the electromagnetic wave-shielding member 2 and can be thus considered as a resonator. When lengths of the resonator in horizontal directions are a (in an X-axis direction) and b (in a Y-axis direction) and a length in a vertical direction is c (in a Z-axis direction), a resonant frequency $f_r$ can be determined as described in Equation 1.

$$f_r = v/(2\pi \times (\mu_r \times \varepsilon_r)^{1/2}) \times \{(m\pi/a)^2 + (n\pi/b)^2 + (p\pi/c)^2\}^{1/2} \quad \text{[Equation 1]}$$

Here, v denotes speed of light, $\mu_r$ denotes relative magnetic permeability, $\varepsilon_r$ denotes relative permittivity, and m, n, and p each denote an integer.

The electromagnetic wave-shielding member 2 is not limited to a particular material as long as it has conductivity, and examples of a material preferably include metallic materials, such as copper, aluminum, iron, stainless steel, and nickel. Alternatively, examples of the material include conductive oxide materials, such as zinc oxide, titanium oxide, and indium tin oxide (ITO), graphite, and organic conductive materials. These may be formed of a plurality of layers made of the above-described member. Furthermore, the material may be an alloy or mixture as long as it has conductivity. In addition, the material may be, for example, plate-like, mesh-like, film-like, or porous-like in shape as long as it operates as an electromagnetic wave-shielding member at a frequency at which power is supplied. Furthermore, the electromagnetic wave-shielding member 2 may be coated with an electromagnetic wave transmitting material, for example, for surface protection. Incidentally, as for electromagnetic wave shielding in the electromagnetic wave-shielding member 2, shielding against electromagnetic waves only has to be provided only at a frequency for wireless power transmission. That is, the electromagnetic wave-shielding member 2 can also be used so that shielding is not provided for communication at a frequency different from the frequency for wireless power transmission.

Figure 2:
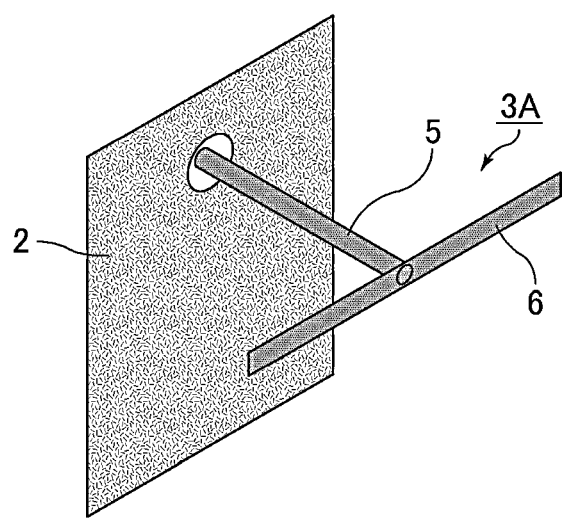
FIG. 2 is a schematic diagram illustrating a power transmission unit that is an example of a power transmission unit.

FIG. 2 is a schematic diagram illustrating a power transmission unit 3A that is an example of the power transmission unit 3. The power transmission unit 3, such as the power transmission unit 3A, is constituted, for example, by a power transmitter including a power transmission antenna mounting portion 5 and a power transmission antenna line 6. The power transmission antenna mounting portion 5 is made of metal, and it is desirable that the power transmission antenna mounting portion 5 be installed roughly perpendicularly to a wall formed of the electromagnetic wave-shielding member 2. Furthermore, the power transmission antenna mounting portion 5 itself may function as part of a power transmission antenna. The power transmission antenna mounting portion 5 is installed such that it does not come into electrical contact with the electromagnetic wave-shielding member 2, and also extends through the electromagnetic wave-shielding member 2 to be electrically connected to a power transmission circuit installed outside the resonator (structure). At this time, a connection portion and the power transmission circuit may be connected appropriately via a connector, such as an SMA (Sub Miniature Type A) terminal. Incidentally, a matching network that adjusts impedance between the above-described power transmission circuit and the power transmission unit 3 may be installed either inside or outside the resonator.

The power transmission antenna line 6 may be placed, for example, on a printed circuit board, but the power transmission antenna mounting portion 5 may be bent to serve as a line. It is desirable that the power transmission antenna line 6 be formed so as to be roughly horizontal to the wall of the resonator formed of the electromagnetic wave-shielding member 2.

As in the power transmission unit 3A illustrated in FIG. 2, it is desirable that the power transmission unit 3 be supplied with power in a monopole mode. In this case, when an electromagnetic wave is confined within the space of the structure and is caused to resonate, an electric field with high directivity can be obtained. A direction of an electric field vector is one direction, and thus, when a directional antenna is used in the power transmission unit, the performance of the wireless power transmission system 1 can be increased. For example, even if an electric field is attempted to be tilted by a slit array antenna or the like, transmission efficiency is just reduced, and the electric field is not tilted.

Figure 3:
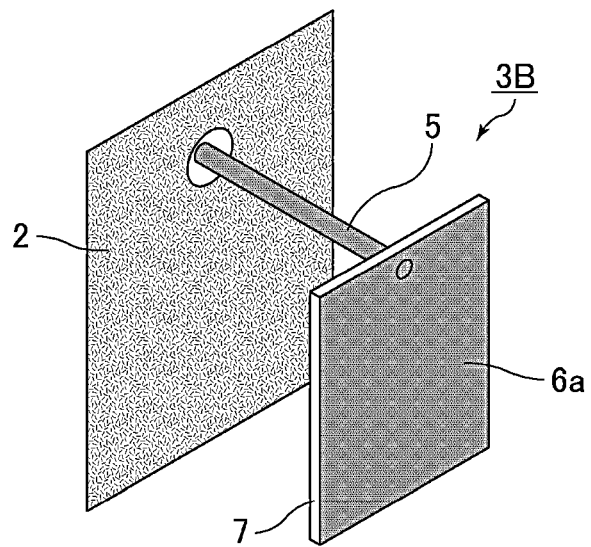
FIG. 3 is a schematic diagram illustrating a power transmission unit that is another example of the power transmission unit.
Figure 4:
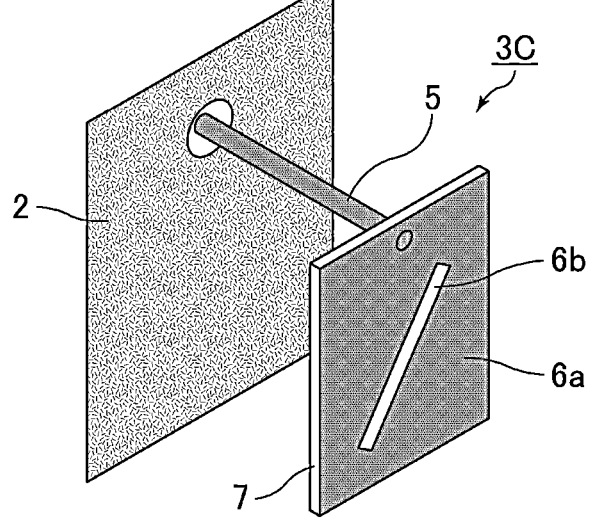
FIG. 4 is a schematic diagram illustrating a power transmission unit that is a modification of the power transmission unit.

FIG. 3 is a schematic diagram illustrating a power transmission unit 3B that is another example of the power transmission unit 3. FIG. 4 is a schematic diagram illustrating a power transmission unit 3C that is a modification of the power transmission unit 3B. The power transmission unit 3B illustrated in FIG. 3 and the power transmission unit 3C illustrated in FIG. 4 are supplied with power in the monopole mode as in the power transmission unit 3A illustrated in FIG. 2. As in the power transmission unit 3B illustrated in FIG. 3 and the power transmission unit 3C illustrated in FIG. 4, it is desirable that the power transmission unit 3 include a microstrip antenna. A power transmission antenna line 6a illustrated in FIGS. 3 and 4 has a microstrip antenna structure. Specifically, there are conductors on both sides of a dielectric substrate 7, the back side (side not illustrated in FIGS. 3 and 4) is connected to a ground, and the front side is a radiating element. In the microstrip antenna structure, the back side is connected to the ground, and thus intense radiation of an electric field is exhibited only on the front side. Hence, power transmission efficiency can be increased. Thus, the power transmission unit 3 including the microstrip antenna is effective for use in a cavity resonator.

If the power transmission unit 3 has a microstrip antenna, a configuration may be provided in which the front side of the dielectric substrate 7 is a radiating element and no conductor is disposed on the back side. In this case, the electromagnetic wave-shielding member 2 functions in the same manner as the above-described back side ground. Furthermore, if the radiating element constituting the front side is thick enough to be able to be self-standing, a configuration may be employed in which the dielectric substrate 7 is not included.

Incidentally, the microstrip antenna may have a linear polarization structure as illustrated in FIG. 3 or may have a circular polarization structure as illustrated in FIG. 4. In the power transmission antenna line 6a illustrated in FIG. 4, there is a degenerate separation element, such as a slit 6b.

Figure 5:
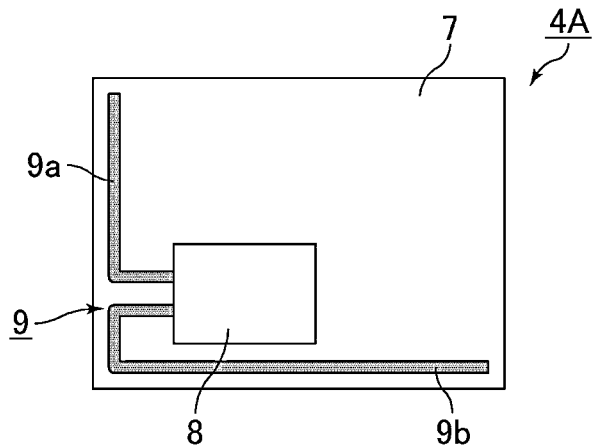
FIG. 5 is a schematic diagram illustrating a power reception unit that is an example of a power reception unit.

FIG. 5 is a schematic diagram illustrating a power reception unit 4A that is an example of the power reception unit 4. The power reception unit 4, such as the power reception unit 4A, is constituted, for example, by a power receiver including a dielectric substrate 7, a rectifier circuit 8, and a power reception antenna 9. In the power reception unit 4, a switch, a matching network, and others may be installed as necessary.

In the power reception unit 4A illustrated in FIG. 5, the power reception antenna 9 includes two power reception antenna lines 9a and 9b disposed in the same plane on the dielectric substrate 7. One ends of the power reception antenna lines 9a and 9b are connected to the rectifier circuit 8. Of the power reception antenna lines 9a and 9b, the other ends different from the one ends connected to the rectifier circuit 8 are open ends.

The power reception antenna lines 9a and 9b are disposed along a periphery of the dielectric substrate 7. The other ends of the respective power reception antenna lines 9a and 9b are placed at different sides of the dielectric substrate 7. That is, the power reception antenna lines 9a and 9b are disposed in opposite directions to each other along the periphery of the dielectric substrate 7. Of the power reception antenna lines 9a and 9b, the length of portions along the periphery of the dielectric substrate 7 is roughly half the length of the periphery of the dielectric substrate 7.

A planar shape of the dielectric substrate 7 is a rectangle, and the power reception antenna lines 9a and 9b are disposed along two sides that are adjacent to and different from each other of the dielectric substrate 7. The other ends of the power reception antenna lines 9a and 9b are placed right up to edges of the dielectric substrate 7. As used herein, "rectangle" refers to a long rectangle or square.

The power reception antenna line 9a has one bending portion. The bending portion of the power reception antenna line 9a may have one step, or two or more steps. The bending portion of the power reception antenna line 9a may be rounded. On the other hand, the power reception antenna line 9b has two bending portions. Each of the bending portions of the power reception antenna line 9b may have one step, or two or more steps. Each of the bending portions of the power reception antenna line 9b may be rounded.

Figure 6:
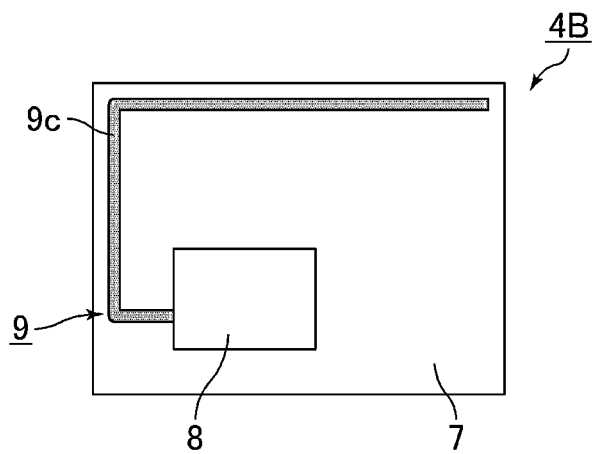
FIG. 6 is a schematic diagram illustrating a power reception unit that is another example of the power reception unit.

FIG. 6 is a schematic diagram illustrating a power reception unit 4B that is another example of the power reception unit 4. In the power reception unit 4B illustrated in FIG. 6, the power reception antenna 9 includes one power reception antenna line 9c disposed in the same plane on the dielectric substrate 7. One end of the power reception antenna line 9c is connected to the rectifier circuit 8. Of the power reception antenna line 9c, the other end different from the one end connected to the rectifier circuit 8 is an open end.

The power reception antenna line 9c is disposed along the periphery of the dielectric substrate 7. Of the power reception antenna line 9c, the length of a portion along the periphery of the dielectric substrate 7 is roughly half the length of the periphery of the dielectric substrate 7.

A planar shape of the dielectric substrate 7 is a rectangle, and the power reception antenna line 9c is disposed along two sides that are adjacent to and different from each other of the dielectric substrate 7. The other end of the power reception antenna line 9c is placed right up to an edge of the dielectric substrate 7.

The power reception antenna line 9c has two bending portions. Each of the bending portions of the power reception antenna line 9c may have one step, or two or more steps. Each of the bending portions of the power reception antenna line 9c may be rounded.

As in the power reception antenna lines 9a and 9b in the power reception unit 4A and the power reception antenna line 9c in the power reception unit 4B, a planar shape of the dielectric substrate is a 2N-sided polygon with line symmetry (where N is an integer of two or more), and a power reception antenna line is disposed along N sides that are adjacent to and different from each other of the dielectric substrate. For example, if the planar shape of the dielectric substrate is a rectangle, the planar shape of the dielectric substrate is a quadrilateral with line symmetry (where N is two), and the power reception antenna line is disposed along two sides that are adjacent to and different from each other of the dielectric substrate.

Figure 7A:
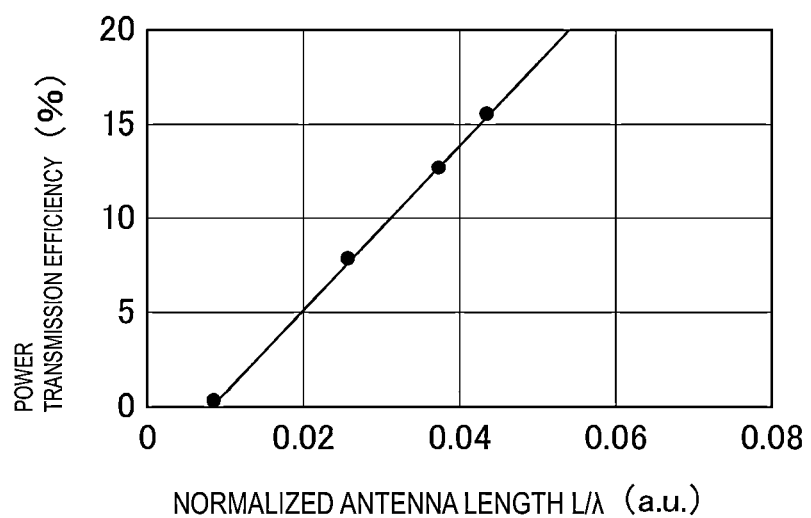
FIG. 7A is a graph illustrating a relationship between normalized antenna length L/A and power transmission efficiency in a case where the power reception unit is used.
Figure 7B:
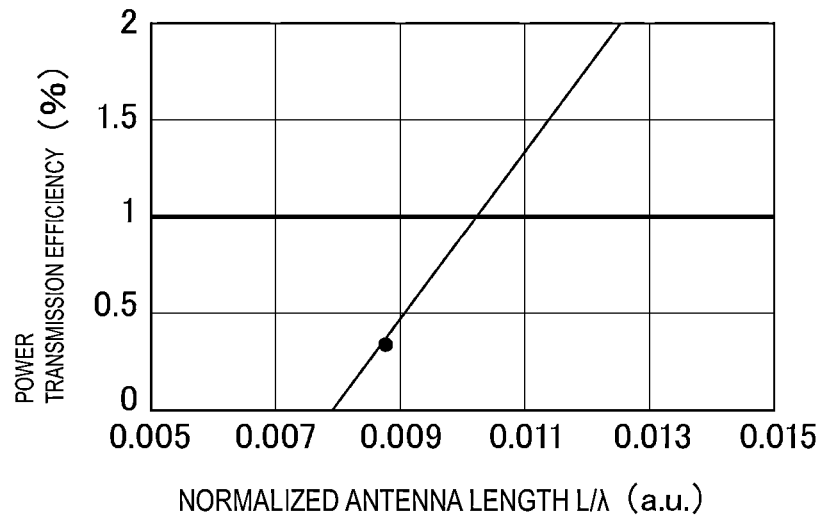
FIG. 7B is an enlargement of FIG. 7A.

To satisfy minimum power transmission efficiency necessary for battery charging of an IOT device, it is desirable that a length L from one end to the other end of the power reception antenna line satisfy, as a relationship between the length L and a wavelength λ of an electromagnetic wave at a resonant frequency, L/λ>0.011. To drive the IOT device or charge a battery for the IOT device, it is desirable that wireless power transmission efficiency be not less than 1%. FIG. 7A illustrates a relationship between normalized antenna length L/λ and power transmission efficiency in a case where the power reception unit 4A is used. From FIG. 7B, which is an enlargement of FIG. 7A, it is found that a wireless power transmission efficiency of not less than 1% can be obtained by satisfying L/λ>0.011. Incidentally, in the power reception unit 4A, the total of a length from the one end to the other end of the power reception antenna line 9a and a length from the one end to the other end of the power reception antenna line 9b corresponds to L.

Furthermore, it is desirable that the other end of the power reception antenna line be placed right up to an edge of the dielectric substrate so that power transmission efficiency can be increased.

The planar shape of the dielectric substrate is not limited to a rectangle, and the planar shape of the dielectric substrate 7 only has to be a 2N-sided polygon with line symmetry (where N is an integer of two or more).

In the present description, an expression "2N-sided polygon with line symmetry" includes not only a shape that is mathematically precisely symmetric with respect to a line but also a shape that can be equated with a shape that is substantially symmetric with respect to a line. Examples of a shape may include a shape with some chipped corners, and a shape with some rounded corners.

In the power reception unit 4, such as the power reception unit 4A illustrated in FIG. 5 or the power reception unit 4B illustrated in FIG. 6, when a power reception antenna line is disposed in the same plane such that the power reception antenna is oriented in a direction of an electric field vector, a property can be obtained in which power reception direction dependence is small. In such a power reception unit 4, a complicated switching circuit like that in Japanese Unexamined Patent Application Publication No. 2020-89209 is unnecessary.

Figure 8:
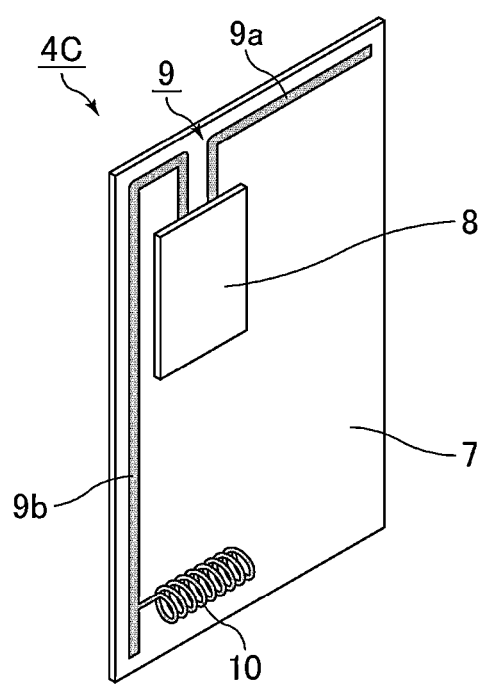
FIG. 8 is a schematic diagram illustrating a power reception unit that is a modification of the power reception unit.

FIG. 8 is a schematic diagram illustrating a power reception unit 4C that is a modification 1 of the power reception unit 4A. As in the power reception unit 4C illustrated in FIG. 8, the power receiver constituting the power reception unit 4 may further include a helical antenna 10 disposed on the dielectric substrate 7. In the power reception unit 4C illustrated in FIG. 8, the helical antenna 10 is electrically connected to the power reception antenna line 9b at the other end of the power reception antenna line 9b or in the vicinity of the other end. When the helical antenna 10 is disposed on the dielectric substrate 7 at an extreme end of the power reception antenna line 9b or in the vicinity of the extreme end, a substrate surface of the power reception antenna 9 can be caused to have sensitivity to an electric field incident thereon at right angles.

A central axis of the helical antenna 10 may be inclined with respect to a direction in which the power reception antenna line 9b extends, but it is desirable that the central axis be orthogonal to the direction in which the power reception antenna line 9b extends as illustrated in FIG. 8.

In the power reception unit 4C illustrated in FIG. 8, the power reception antenna 9 includes two power reception antenna lines 9a and 9b as in FIG. 5, and the helical antenna 10 is electrically connected to the power reception antenna line 9b at the other end of the power reception antenna line 9b or in the vicinity of the other end. However, the helical antenna 10 may be electrically connected to the power reception antenna line 9a at the other end of the power reception antenna line 9a or in the vicinity of the other end. Alternatively, the power reception antenna 9 may include one power reception antenna line 9c as in FIG. 6. In this case, the helical antenna 10 may be electrically connected to the power reception antenna line 9c at the other end of the power reception antenna line 9c or in the vicinity of the other end.

Figure 9:
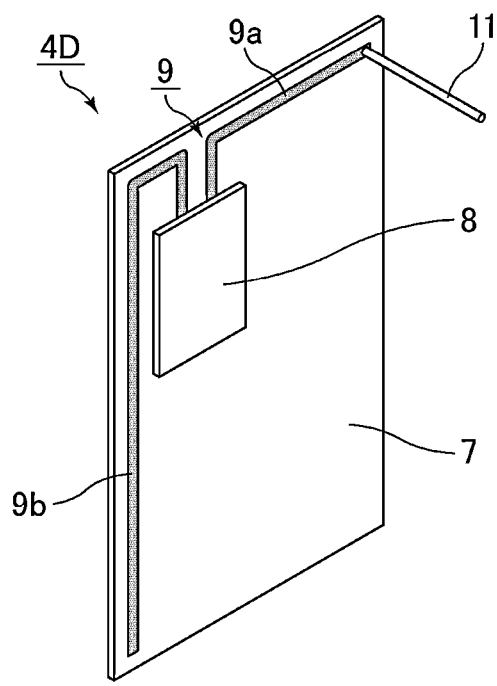
FIG. 9 is a schematic diagram illustrating a power reception unit that is a modification of the power reception unit.

FIG. 9 is a schematic diagram illustrating a power reception unit 4D that is a modification 2 of the power reception unit 4A. As in the power reception unit 4D illustrated in FIG. 9, the power receiver constituting the power reception unit 4 may further include a three-dimensional antenna 11 disposed in a direction orthogonal to the dielectric substrate 7. In the power reception unit 4D illustrated in FIG. 9, the three-dimensional antenna 11 is electrically connected to the power reception antenna line 9a at the other end of the power reception antenna line 9a or in the vicinity of the other end. When the three-dimensional antenna 11 is disposed perpendicularly to the dielectric substrate 7 at an extreme end of the power reception antenna line 9a or in the vicinity of the extreme end, the substrate surface of the power reception antenna 9 can be caused to have sensitivity to an electric field incident thereon at right angles.

In the power reception unit 4D illustrated in FIG. 9, the power reception antenna 9 includes two power reception antenna lines 9a and 9b as in FIG. 5, and the three-dimensional antenna 11 is electrically connected to the power reception antenna line 9a at the other end of the power reception antenna line 9a or in the vicinity of the other end. However, the three-dimensional antenna 11 may be electrically connected to the power reception antenna line 9b at the other end of the power reception antenna line 9b or in the vicinity of the other end. Alternatively, the power reception antenna 9 may include one power reception antenna line 9c as in FIG. 6. In this case, the three-dimensional antenna 11 may be electrically connected to the power reception antenna line 9c at the other end of the power reception antenna line 9c or in the vicinity of the other end.

Figure 10:
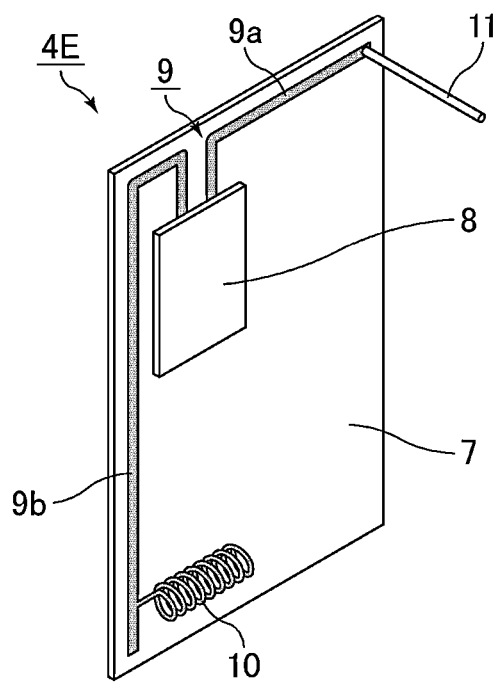
FIG. 10 is a schematic diagram illustrating a power reception unit that is a modification of the power reception unit.

FIG. 10 is a schematic diagram illustrating a power reception unit 4E that is a modification 3 of the power reception unit 4A. As in the power reception unit 4E illustrated in FIG. 10, the power receiver constituting the power reception unit 4 may further include the helical antenna 10 disposed on the dielectric substrate 7, and the three-dimensional antenna 11 disposed in the direction orthogonal to the dielectric substrate 7. In the power reception unit 4E illustrated in FIG. 10, the helical antenna 10 is electrically connected to the power reception antenna line 9b at the other end of the power reception antenna line 9b or in the vicinity of the other end, and the three-dimensional antenna 11 is electrically connected to the power reception antenna line 9a at the other end of the power reception antenna line 9a or in the vicinity of the other end. When both the helical antenna 10 and the three-dimensional antenna 11 are disposed, the above-described performance can be increased further.

The central axis of the helical antenna 10 may be inclined with respect to the direction in which the power reception antenna line 9b extends, but it is desirable that the central axis be orthogonal to the direction in which the power reception antenna line 9b extends as illustrated in FIG. 10.

In the power reception unit 4E illustrated in FIG. 10, the power reception antenna 9 includes two power reception antenna lines 9a and 9b as in FIG. 5, the helical antenna 10 is electrically connected to the power reception antenna line 9b at the other end of the power reception antenna line 9b or in the vicinity of the other end, and the three-dimensional antenna 11 is electrically connected to the power reception antenna line 9a at the other end of the power reception antenna line 9a or in the vicinity of the other end. However, the helical antenna 10 may be electrically connected to the power reception antenna line 9a at the other end of the power reception antenna line 9a or in the vicinity of the other end, and the three-dimensional antenna 11 may be electrically connected to the power reception antenna line 9b at the other end of the power reception antenna line 9b or in the vicinity of the other end. Alternatively, the power reception antenna 9 may include one power reception antenna line 9c as in FIG. 6. In this case, the helical antenna 10 may be electrically connected to the power reception antenna line 9c at the other end of the power reception antenna line 9c or in the vicinity of the other end, and the three-dimensional antenna 11 may be electrically connected to the power reception antenna line 9c at the other end of the power reception antenna line 9c or in the vicinity of the other end.

In the present description, an expression "the vicinity of the other end of a power reception antenna line" refers to an area located within 10% of the length of the periphery of the dielectric substrate from the other end of the power reception antenna line.

Incidentally, although not illustrated in the power reception unit 4A illustrated in FIG. 5, the power reception unit 4B illustrated in FIG. 6, the power reception unit 4C illustrated in FIG. 8, the power reception unit 4D illustrated in FIG. 9, and the power reception unit 4E illustrated in FIG. 10, on the dielectric substrate 7, a communication module may be implemented, or a circuit constituting a sensor module may be formed. That is, the dielectric substrate 7 may be used as part of a circuit board of an IOT device.

As described above, when antennas of the power transmission unit 3 and the power reception unit 4 are designed, the wireless power transmission system that has a high-degree of freedom for the installation direction of the power receiver can be implemented.

The wireless power transmission system according to the present disclosure is not limited only to the above-described embodiment, and various applications and changes can be made within the scope of the present disclosure.

EXAMPLES

Examples that more specifically disclose the wireless power transmission system according to the present disclosure will be given below. Note that the present disclosure is not to be limited only to these examples.

Example 1

In Example 1, the wireless power transmission system 1 illustrated in FIG. 1 including the resonator (structure) formed of the electromagnetic wave-shielding member 2, the power transmission unit 3, and the power reception unit 4 is discussed.

Figure 11:
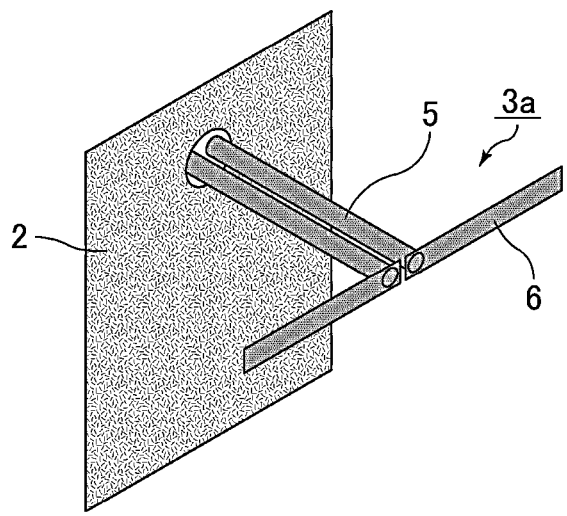
FIG. 11 is a schematic diagram of a power transmission unit according to Example 1 of the present disclosure.

As the power transmission unit 3, a power transmission unit 3a illustrated in FIG. 11 or the power transmission unit 3A illustrated in FIG. 2 is used. The power transmission unit 3a illustrated in FIG. 11 includes a power transmission antenna that is supplied with power in a dipole mode. On the other hand, the power transmission unit 3A illustrated in FIG. 2 includes a power transmission antenna that is supplied with power in a monopole mode.

Figure 12:
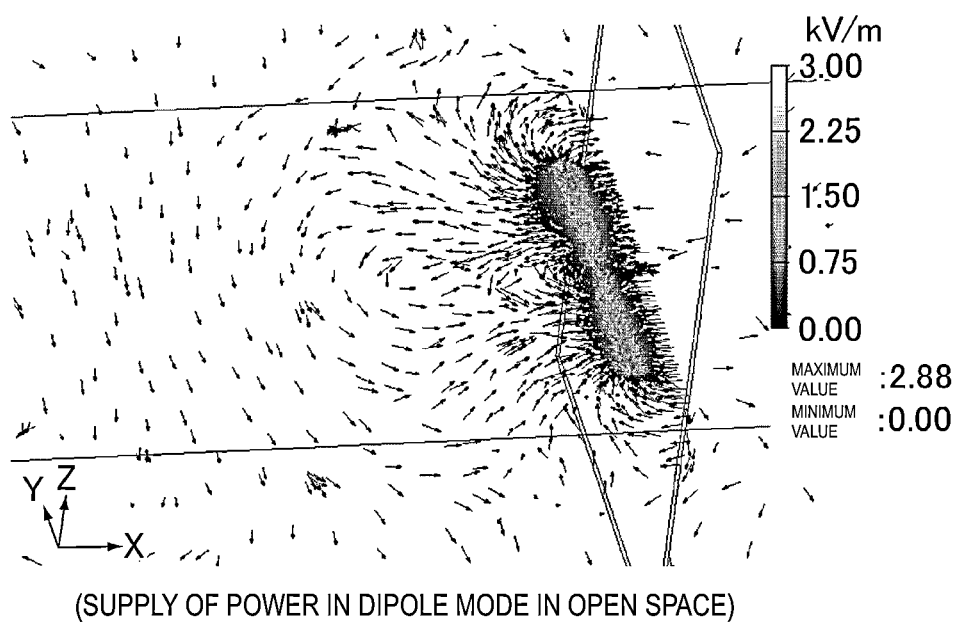
FIG. 12 is a schematic diagram illustrating an electric field distribution in a case where power is supplied in a dipole mode in an open space.
Figure 13:
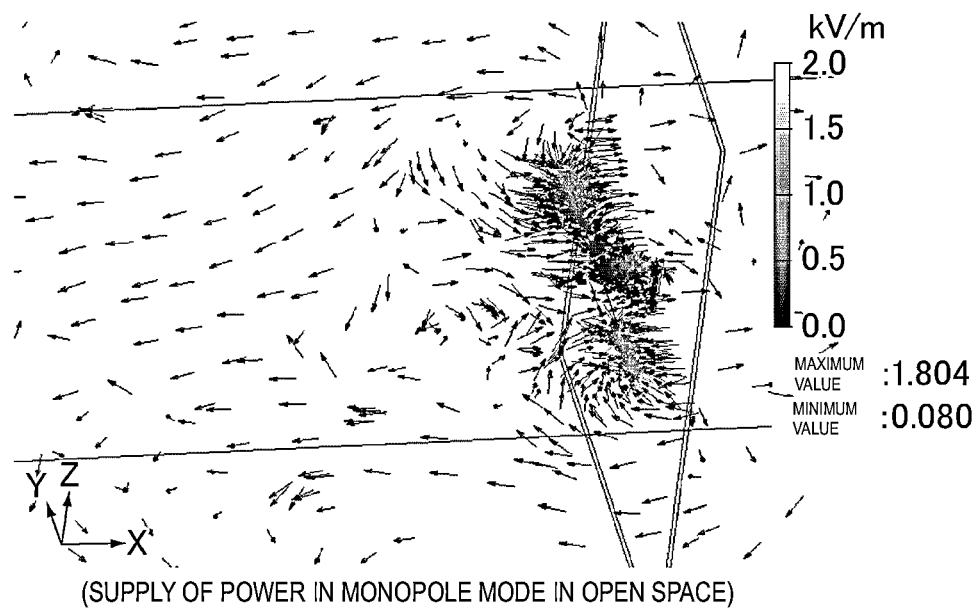
FIG. 13 is a schematic diagram illustrating an electric field distribution in a case where power is supplied in a monopole mode in the open space.

In a space that has the electromagnetic wave-shielding member 2 only at the back of the power transmission antenna and that is open in directions other than toward the electromagnetic wave-shielding member 2 as illustrated in FIG. 11 or 2, an electric field distribution in a case where power is supplied in the dipole mode is illustrated in FIG. 12, and an electric field distribution in a case where power is supplied in the monopole mode is illustrated in FIG. 13. As illustrated in FIGS. 12 and 13, in both the cases, an electric field is formed such that a vortex is formed around the power transmission antenna.

Figure 14:
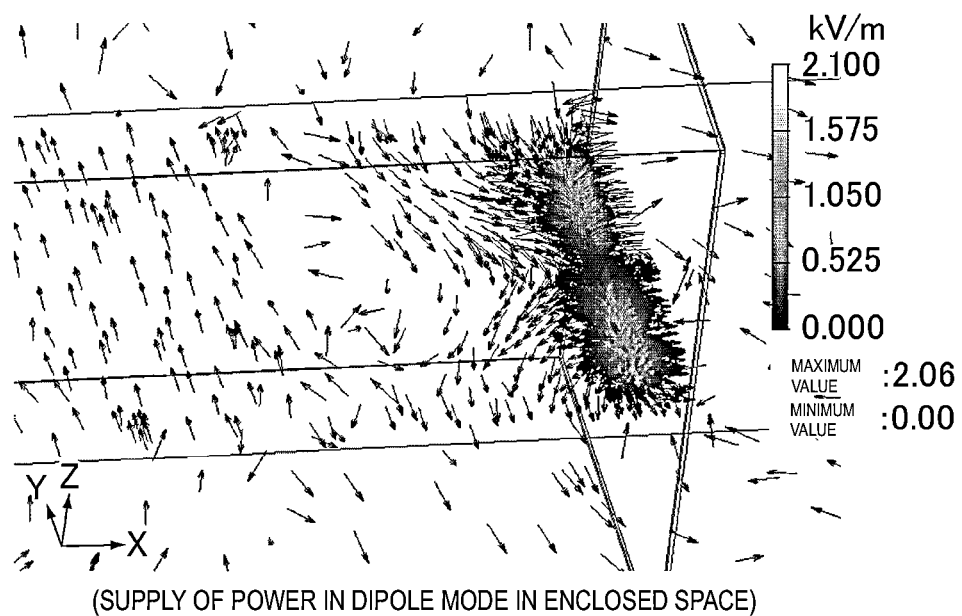
FIG. 14 is a schematic diagram illustrating an electric field distribution in a case where power is supplied in the dipole mode in an enclosed space.
Figure 15:
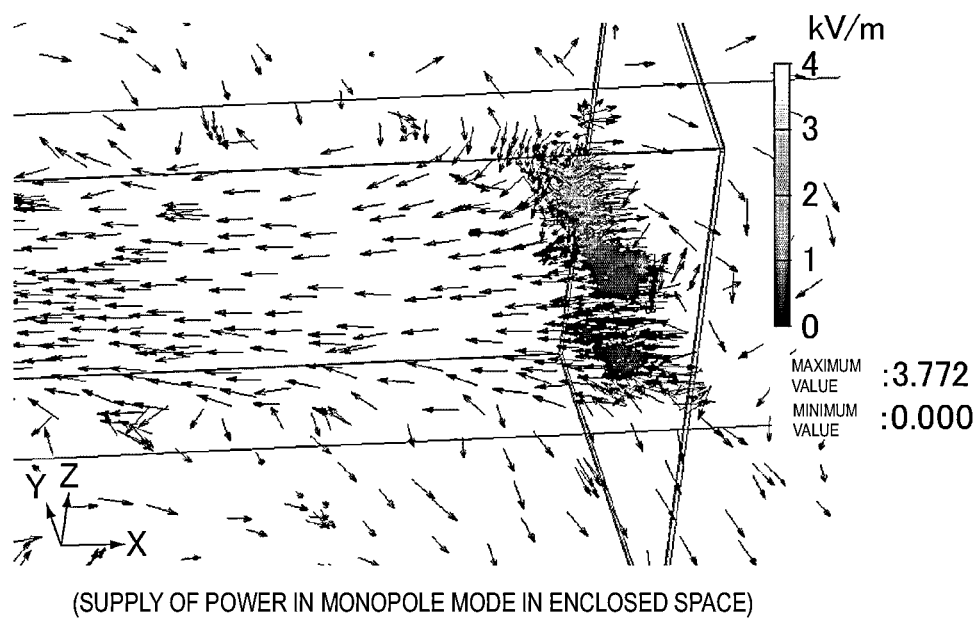
FIG. 15 is a schematic diagram illustrating an electric field distribution in a case where power is supplied in the monopole mode in the enclosed space.

Electric field distributions at a resonant frequency in a case where the space is covered by the electromagnetic wave-shielding member 2 in all directions in the layout illustrated in FIGS. 12 and 13 are illustrated in FIGS. 14 and 15. Even if power transmission antennas are similar in shape to those illustrated in FIGS. 11 and 2, unlike in a case where power is supplied in the dipole mode illustrated in FIG. 14, in a case where power is supplied in the monopole mode illustrated in FIG. 15, an electric field distribution with very high rectilinearity results. Hence, when power is supplied in the monopole mode, antenna design in the power receiver is facilitated, and power transmission efficiency can be increased.

Example 2

In Example 2, an evaluation was performed on power transmission efficiency on condition that the power transmission antenna according to Example 1 is supplied with power in the monopole mode in a resonator space of the wireless power transmission system 1 illustrated in FIG. 1.

Figure 16:
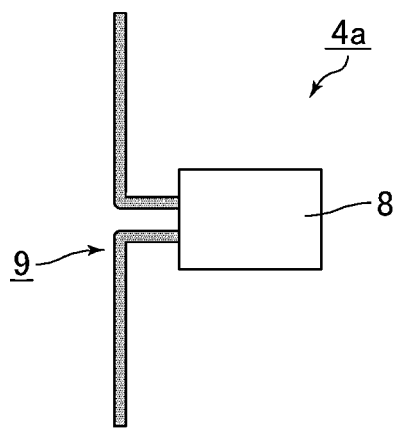
FIG. 16 is a schematic diagram of a power reception unit according to Example 2 of the present disclosure.

As the power reception unit 4, the power reception unit 4A illustrated in FIG. 5 or a power reception unit 4a illustrated in FIG. 16 is used. A power reception antenna structure illustrated in FIG. 16 is a so-called dipole antenna structure.

In the wireless power transmission system 1 prepared in this way, power transmission efficiency between the power transmission unit 3 and the power reception unit 4 was analyzed by using analysis simulation software Femtet (registered trademark).

Figure 17:
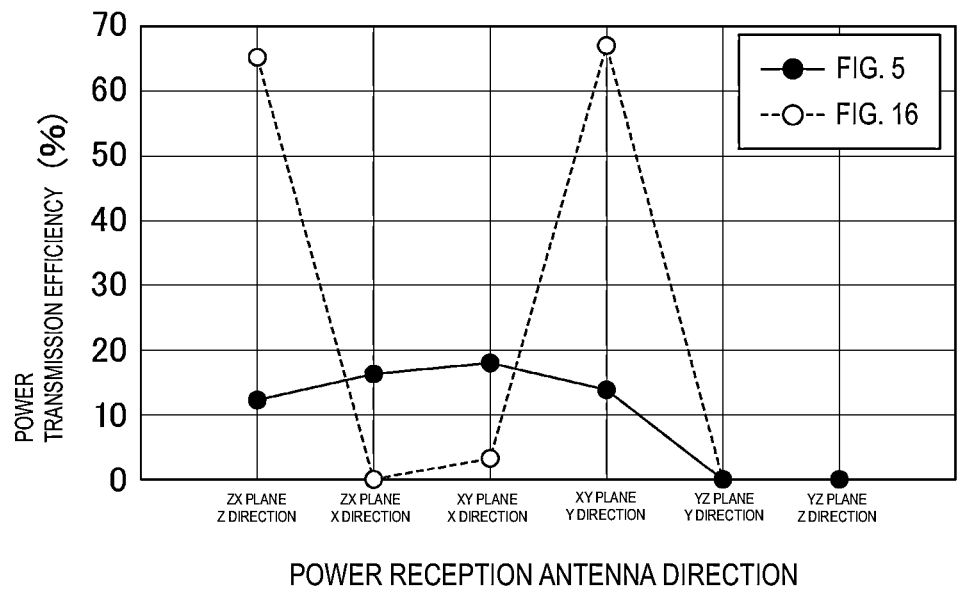
FIG. 17 is a graph illustrating a relationship of power transmission efficiency with respect to a power reception antenna direction in the wireless power transmission system according to Example 2 of the present disclosure.

FIG. 17 illustrates a relationship of power transmission efficiency with respect to a power reception antenna direction in the wireless power transmission system according to Example 2 of the present disclosure. Here, of power reception antenna directions, a plane forming the power reception antenna 9 is defined as a power reception antenna plane direction, and a direction in which the power reception antenna 9 extends from the rectifier circuit 8 is defined as a power reception antenna line direction. For example, in the power reception unit 4 in a state illustrated in FIG. 1, the power reception antenna plane direction is a ZX plane, and the power reception antenna line direction is an X direction.

As seen in FIG. 17, as for the power reception antenna having the structure illustrated in FIG. 5, in power reception antenna directions other than a YZ plane (directions of an electric field incident on the dielectric substrate at right angles), direction dependence of the power receiver is small. On the other hand, as for the power reception antenna having the structure illustrated in FIG. 16, the power reception antenna has little sensitivity not only in the YZ plane, but also in the ZX plane/X direction and an XY plane/X direction.

As described above, when the power reception unit 4A including the power reception antenna illustrated in FIG. 5 is used, a wiring structure disclosed in Japanese Unexamined Patent Application Publication No. 2020-89209 does not have to be used, and, at the same time, the number of permissible power reception directions can be increased.

Example 3

In Example 3, the power transmission unit 3B illustrated in FIG. 3 or the power transmission unit 3C illustrated in FIG. 4 is used in place of the power transmission unit 3A illustrated in FIG. 2.

Figure 18:
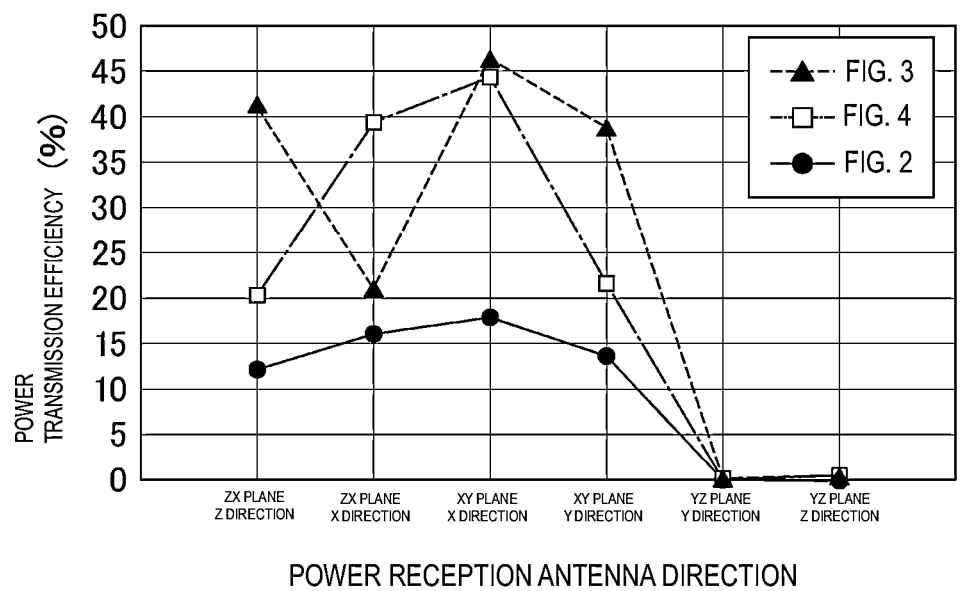
FIG. 18 is a graph illustrating a relationship of power transmission efficiency with respect to a power reception antenna direction in the wireless power transmission system according to Example 3 of the present disclosure.

FIG. 18 illustrates a relationship of power transmission efficiency with respect to a power reception antenna direction in the wireless power transmission system according to Example 3 of the present disclosure.

As seen in FIG. 18, when the power transmission unit 3B (linear polarization structure) or the power transmission unit 3C (circular polarization structure) that has a microstrip antenna structure with high rectilinearity as illustrated in FIG. 3 or 4 is used, power can be transmitted in all the power reception antenna directions with higher efficiency than the case where the power transmission unit 3A that has a linear structure as illustrated in FIG. 2 is used.

Example 4

Figure 19:
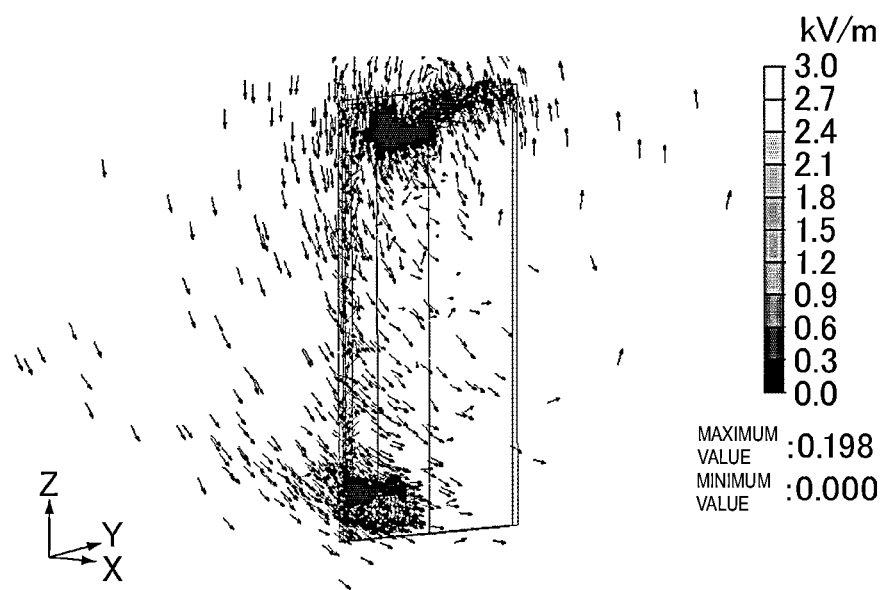
FIG. 19 is a schematic diagram illustrating a magnetic field distribution around a power receiver.

As indicated in Example 1, when the supply of power in the monopole mode is used, an electric field distribution with high rectilinearity can be obtained. For this reason, when the power receiver is oriented toward the YZ plane, power is difficult to receive. However, in terms of a magnetic field distribution around the power receiver, a magnetic field distribution having a component parallel to the dielectric substrate can be obtained as illustrated in FIG. 19. Thus, when a helical antenna is disposed at an extreme end of a power reception antenna line or in the vicinity of the extreme end, some electromagnetic waves can be received even when the power receiver is oriented toward the YZ plane.

In Example 4, the power reception unit 4C illustrated in FIG. 8 is used in place of the power reception unit 4A illustrated in FIG. 5. Furthermore, as the power transmission unit 3, the power transmission unit 3B illustrated in FIG. 3 is used.

Figure 20:
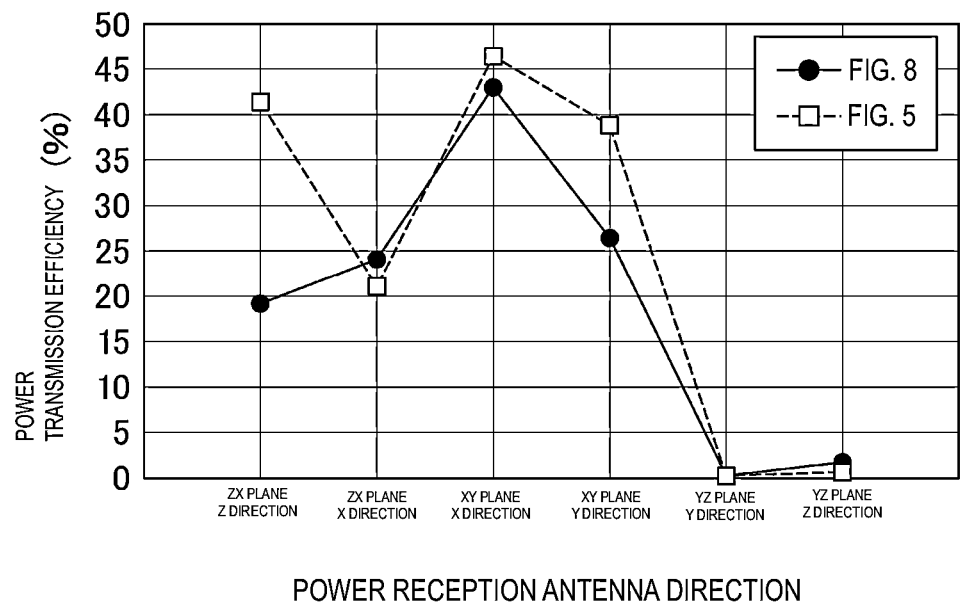
FIG. 20 is a graph illustrating a relationship of power transmission efficiency with respect to a power reception antenna direction in the wireless power transmission system according to Example 4 of the present disclosure.

FIG. 20 illustrates a relationship of power transmission efficiency with respect to a power reception antenna direction in the wireless power transmission system according to Example 4 of the present disclosure.

As seen in FIG. 20, when the power reception unit 4C illustrated in FIG. 8 including the helical antenna is used, power reception sensitivity is exhibited in the YZ plane as well in comparison with the case where the power reception unit 4A illustrated in FIG. 5 including no helical antenna is used.

Example 5

As indicated in Example 1, when the supply of power in the monopole mode is used, an electric field distribution with high rectilinearity can be obtained. For this reason, when the power receiver is oriented toward the YZ plane, power is difficult to receive. Thus, when a three-dimensional antenna is disposed perpendicularly to the dielectric substrate at an extreme end of a power reception antenna line or in the vicinity of the extreme end, an electromagnetic wave can be received even when the power receiver is oriented toward the YZ plane.

In Example 5, the power reception unit 4D illustrated in FIG. 9 is used in place of the power reception unit 4A illustrated in FIG. 5. Furthermore, as the power transmission unit 3, the power transmission unit 3B illustrated in FIG. 3 is used.

Figure 21:
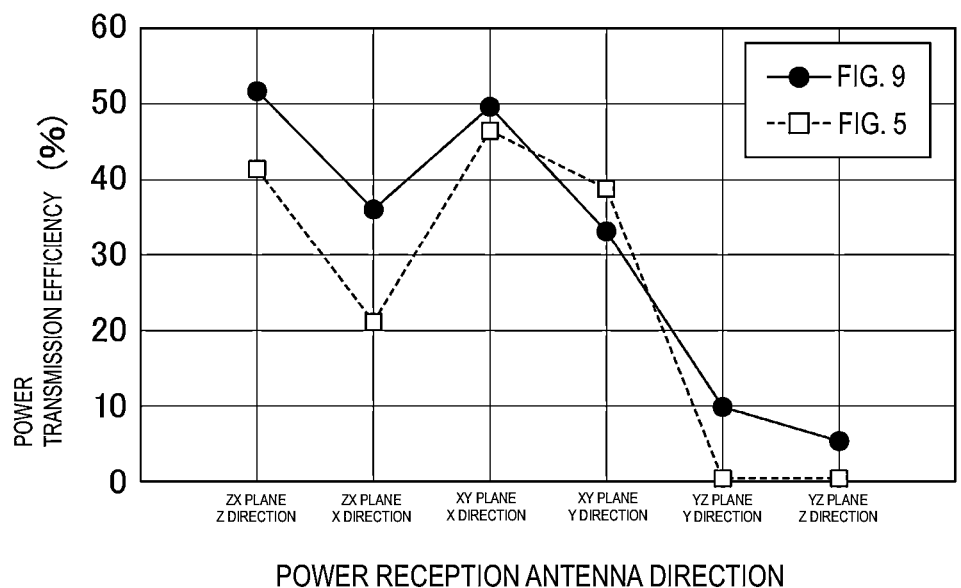
FIG. 21 is a graph illustrating a relationship of power transmission efficiency with respect to a power reception antenna direction in the wireless power transmission system according to Example 5 of the present disclosure.

FIG. 21 illustrates a relationship of power transmission efficiency with respect to a power reception antenna direction in the wireless power transmission system according to Example 5 of the present disclosure.

As seen in FIG. 21, when the power reception unit 4D illustrated in FIG. 9 including the three-dimensional antenna is used, power reception sensitivity is exhibited in the YZ plane as well in comparison with the case where the power reception unit 4A illustrated in FIG. 5 including no three-dimensional antenna is used.

Example 6

As indicated in Example 1, when the supply of power in the monopole mode is used, an electric field distribution with high rectilinearity can be obtained. For this reason, when the power receiver is oriented toward the YZ plane, power is difficult to receive. In response to this, when a helical antenna is disposed at an extreme end of a power reception antenna line or in the vicinity of the extreme end as indicated in Example 4, or when a three-dimensional antenna is disposed perpendicularly to the dielectric substrate at an extreme end of a power reception antenna line or in the vicinity of the extreme end as indicated in Example 5, power reception sensitivity in the YZ plane can be provided.

In Example 6, the power reception unit 4E illustrated in FIG. 10 is used in place of the power reception unit 4A illustrated in FIG. 5. Furthermore, as the power transmission unit 3, the power transmission unit 3B illustrated in FIG. 3 is used.

Figure 22:
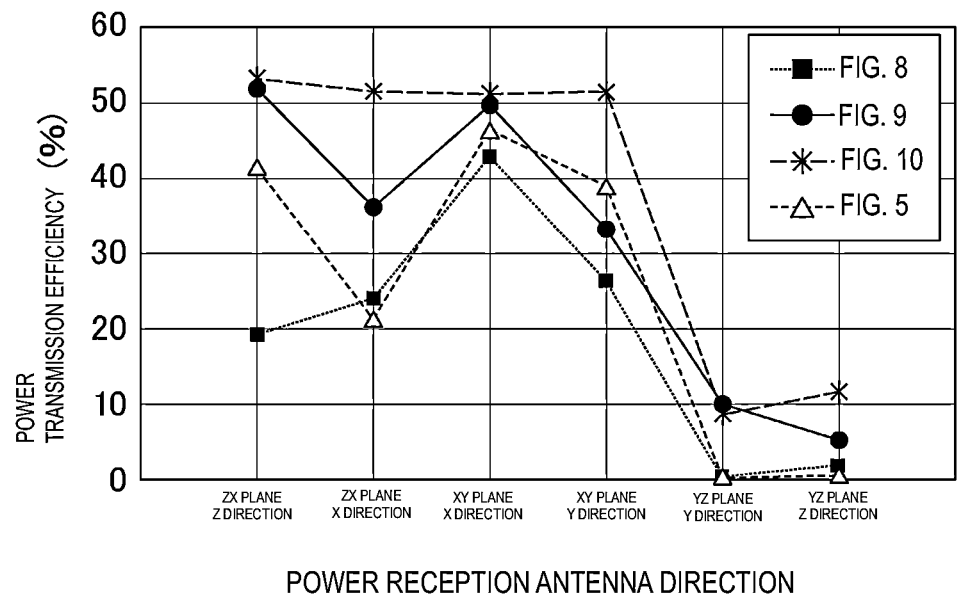
FIG. 22 is a graph illustrating relationships of power transmission efficiency with respect to power reception antenna directions in the wireless power transmission systems according to Examples 4 to 6 of the present disclosure.

FIG. 22 illustrates relationships of power transmission efficiency with respect to power reception antenna directions in the wireless power transmission systems according to Examples 4 to 6 of the present disclosure.

As seen in FIG. 22, when the power reception unit 4E illustrated in FIG. 10 including both the helical antenna and the three-dimensional antenna is used, higher power reception sensitivity is exhibited in all the power reception antenna directions. Furthermore, when the power reception unit 4E illustrated in FIG. 10 is used, direction dependence in the ZX plane and the XY plane is small.

What is claimed is:

1. A wireless power transmission system comprising:
   a structure surrounded as a whole by an electromagnetic wave-shielding member having an appropriate conductivity;
   at least one power transmission unit; and
   at least one power reception unit, the wireless power transmission system being configured to use a resonant mode in the structure,
   wherein
   the power reception unit includes a power receiver including a dielectric substrate, a helical antenna on the dielectric substrate, a rectifier circuit, and a power reception antenna,
      wherein the power reception antenna includes a power reception antenna line in a same plane on the dielectric substrate,
      one end of the power reception antenna line is connected to the rectifier circuit,
      of the power reception antenna line, another end different from the one end connected to the rectifier circuit is an open end,
      a planar shape of the dielectric substrate is a 2N-sided polygon with line symmetry, where N is an integer of two or more,
      the power reception antenna line is along N sides that are adjacent to and different from each other of the dielectric substrate, and
      the helical antenna is electrically connected to the power reception antenna line at the other end of the power reception antenna line or in a vicinity of the other end.

2. The wireless power transmission system according to claim 1, wherein
   the planar shape of the dielectric substrate is a rectangle, and
   the power reception antenna line is along two sides that are adjacent to and different from each other of the dielectric substrate.

3. The wireless power transmission system according to claim 1, wherein
   the power reception antenna includes two power reception antenna lines, each of which is the power reception antenna line, along a periphery of the dielectric substrate, and
   other ends of the respective power reception antennas are at different sides of the dielectric substrate.

4. The wireless power transmission system according to claim 1, wherein
   the power reception antenna includes one power reception antenna line, which is the power reception antenna line, along a periphery of the dielectric substrate.

5. The wireless power transmission system according to claim 1, wherein
   the power transmission unit is configured to be supplied with power in a monopole mode.

6. The wireless power transmission system according to claim 5, wherein
   the power transmission unit includes a microstrip antenna.

7. The wireless power transmission system according to claim 1, wherein
   a central axis of the helical antenna is orthogonal to a direction in which the power reception antenna line extends.

8. The wireless power transmission system according to claim 2, wherein
   the power reception antenna includes two power reception antenna lines, each of which is the power reception antenna line, along a periphery of the dielectric substrate, and
   other ends of the respective power reception antennas are at different sides of the dielectric substrate.

9. The wireless power transmission system according to claim 2, wherein
   the power reception antenna includes one power reception antenna line, which is the power reception antenna line, along a periphery of the dielectric substrate.

10. A wireless power transmission system comprising:
    a structure surrounded as a whole by an electromagnetic wave-shielding member having an appropriate conductivity;
    at least one power transmission unit; and
    at least one power reception unit, the wireless power transmission system being configured to use a resonant mode in the structure,
    wherein
    the power reception unit includes a power receiver including a dielectric substrate, a three-dimensional antenna in a direction orthogonal to the dielectric substrate, a rectifier circuit, and a power reception antenna,
       wherein the power reception antenna includes a power reception antenna line in a same plane on the dielectric substrate,
       one end of the power reception antenna line is connected to the rectifier circuit,
       of the power reception antenna line, another end different from the one end connected to the rectifier circuit is an open end,
       a planar shape of the dielectric substrate is a 2N-sided polygon with line symmetry, where N is an integer of two or more,
       the power reception antenna line is along N sides that are adjacent to and different from each other of the dielectric substrate, and
       the three-dimensional antenna is electrically connected to the power reception antenna line at the other end of the power reception antenna line or in a vicinity of the other end.

11. A wireless power transmission system comprising:
    a structure surrounded as a whole by an electromagnetic wave-shielding member having an appropriate conductivity;
    at least one power transmission unit; and
    at least one power reception unit, the wireless power transmission system being configured to use a resonant mode in the structure,
    wherein
    the power reception unit includes a power receiver including a dielectric substrate, a helical antenna on the dielectric substrate, a three-dimensional antenna in a direction orthogonal to the dielectric substrate, a rectifier circuit, and a power reception antenna,
       wherein the power reception antenna includes a power reception antenna line in a same plane on the dielectric substrate,
       one end of the power reception antenna line is connected to the rectifier circuit,
       of the power reception antenna line, another end different from the one end connected to the rectifier circuit is an open end, a planar shape of the dielectric substrate is a 2N-sided polygon with line symmetry, where N is an integer of two or more, the power reception antenna line is along N sides that are adjacent to and different from each other of the dielectric substrate, and the helical antenna and the three-dimensional antenna are electrically connected to the respective power reception antenna lines at the other ends of the respective power reception antenna lines or in vicinities of the other ends.

12. A power receiver of a wireless power transmission system, the wireless power transmission system including a structure surrounded as a whole by an electromagnetic wave-shielding member having an appropriate conductivity, at least one power transmission unit, and at least one power reception unit and that is configured to use a resonant mode in the structure, the power receiver being configured in the power reception unit, and the power receiver comprising:

a dielectric substrate;
a helical antenna on the dielectric substrate;
a rectifier circuit; and
a power reception antenna,
wherein the power reception antenna includes a power reception antenna line in a same plane on the dielectric substrate, one end of the power reception antenna line is connected to the rectifier circuit, of the power reception antenna line, another end different from the one end connected to the rectifier circuit is an open end, a planar shape of the dielectric substrate is a 2N-sided polygon with line symmetry, where N is an integer of two or more, the power reception antenna line is along N sides that are adjacent to and different from each other of the dielectric substrate, and the helical antenna is electrically connected to the power reception antenna line at the other end of the power reception antenna line or in a vicinity of the other end.

13. The power receiver according to claim 12, wherein the planar shape of the dielectric substrate is a rectangle, and the power reception antenna line is along two sides that are adjacent to and different from each other of the dielectric substrate.

14. The power receiver according to claim 12, wherein the power reception antenna includes two power reception antenna lines, each of which is the power reception antenna line, along a periphery of the dielectric substrate, and other ends of the respective power reception antennas are at different sides of the dielectric substrate.

15. The power receiver according to claim 12, wherein the power reception antenna includes one power reception antenna line, which is the power reception antenna line, along a periphery of the dielectric substrate.

16. The power receiver according to claim 12, wherein a central axis of the helical antenna is orthogonal to a direction in which the power reception antenna line extends.

17. A power receiver of a wireless power transmission system, the wireless power transmission system including a structure surrounded as a whole by an electromagnetic wave-shielding member having an appropriate conductivity, at least one power transmission unit, and at least one power reception unit and that is configured to use a resonant mode in the structure, the power receiver being configured in the power reception unit, and the power receiver comprising:

a dielectric substrate;
a rectifier circuit;
a power reception antenna; and
a three-dimensional antenna in a direction orthogonal to the dielectric substrate,
wherein the power reception antenna includes a power reception antenna line in a same plane on the dielectric substrate, one end of the power reception antenna line is connected to the rectifier circuit, of the power reception antenna line, another end different from the one end connected to the rectifier circuit is an open end, a planar shape of the dielectric substrate is a 2N-sided polygon with line symmetry, where N is an integer of two or more, the power reception antenna line is along N sides that are adjacent to and different from each other of the dielectric substrate, and the three-dimensional antenna is electrically connected to the power reception antenna line at the other end of the power reception antenna line or in a vicinity of the other end.

18. A power receiver of a wireless power transmission system, the wireless power transmission system including a structure surrounded as a whole by an electromagnetic wave-shielding member having an appropriate conductivity, at least one power transmission unit, and at least one power reception unit and that is configured to use a resonant mode in the structure, the power receiver being configured in the power reception unit, and the power receiver comprising:

a dielectric substrate;
a rectifier circuit;
a power reception antenna; and
a helical antenna on the dielectric substrate; and a three-dimensional antenna disposed in a direction orthogonal to the dielectric substrate,
wherein the power reception antenna includes a power reception antenna line in a same plane on the dielectric substrate, one end of the power reception antenna line is connected to the rectifier circuit, of the power reception antenna line, another end different from the one end connected to the rectifier circuit is an open end, a planar shape of the dielectric substrate is a 2N-sided polygon with line symmetry, where N is an integer of two or more, the power reception antenna line is along N sides that are adjacent to and different from each other of the dielectric substrate, and the helical antenna and the three-dimensional antenna are electrically connected to the respective power reception antenna lines at the other ends of the respective power reception antenna lines or in vicinities of the other ends.

* * * * *